(12) United States Patent
Furodet et al.

(10) Patent No.: US 8,849,841 B2
(45) Date of Patent: Sep. 30, 2014

(54) MEMORY CIRCUIT FOR AHO-CORASICK TYPE CHARACTER RECOGNITION AUTOMATON AND METHOD OF STORING DATA IN SUCH A CIRCUIT

(75) Inventors: David Furodet, Saint-Martin d'Hères (FR); Nicolas Albarel, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 1310 days.

(21) Appl. No.: 11/533,543

(22) Filed: Sep. 20, 2006

(65) Prior Publication Data
US 2007/0075878 A1    Apr. 5, 2007

(30) Foreign Application Priority Data
Sep. 21, 2005    (FR) .................................. 05 09640

(51) Int. Cl.
*G06F 7/00*    (2006.01)
*G06F 17/30*    (2006.01)

(52) U.S. Cl.
CPC ................................ *G06F 17/30985* (2013.01)
USPC ........................................................ 707/758

(58) Field of Classification Search
CPC ................................................ G06F 17/30985
USPC ........................................................ 707/758
See application file for complete search history.

(56) References Cited

U.S. PATENT DOCUMENTS 5,140,644 A * 8/1992 Kawaguchi et al. .......... 382/226
5,995,963 A * 11/1999 Nanba et al. ..................... 1/1
7,359,895 B2 * 4/2008 Chang et al. ..................... 707/3
7,366,726 B2 * 4/2008 Bellamy et al. ................ 707/100
2004/0103086 A1 * 5/2004 Vinnakota et al. ................ 707/3

OTHER PUBLICATIONS

Heyes, Tree_NodeCollection Class, 2003, phpguru.org.*
Swartz, C++ Notes, 2001, www.fredosaurus.com.*
Katashita et al., A Method of Generating Highly Efficient String Matching Circuit for Intrusion Detection, 2006, IEEE Xplore.*
Microsoft Corporation,"Microsoft Computer Dictionary", 2002, Microsoft Press, 5th Ed.*
Tuck et al., Deterministic Memory-Efficient String Matching Algorithms for intrusion Detection, Infocom 2004, Twenty-Third Annual Joint Conference of the IEEE Computer and Communications Societies, Mar. 7-11, 2004, vol. 4, pp. 2628-2639.
Aho et al, Efficient String Matching: An Aid to Bibliographic Search, Communications of the Association for Computing Machinery, New York, NY, vol. 18, No. 6, Jun. 1975, pp. 333-340.

* cited by examiner

*Primary Examiner* — Rehana Perveen
*Assistant Examiner* — Huen Wong
(74) *Attorney, Agent, or Firm* — Allen, Dyer, Doppelt, Milbrath & Gilchrist, P.A.

(57) ABSTRACT

A memory circuit for an Aho-Corasick type character recognition automaton uses a node tree for recognizing predetermined strings of characters in an incoming data stream. The recognition is based upon successive transitions in the node tree stored in memory in which each node corresponds to a recognized sequence of a character string. At least part of the nodes are related to a consecutive node by a valid transition, from an initial state to terminal states, with each one corresponding to a recognized character string This memory circuit includes first sets of consecutive memory addresses defining respectively strings of consecutive nodes accessible sequentially during successive transitions to a terminal state, and second sets of memory addresses defining multiple nodes each pointing to several states.

24 Claims, 5 Drawing Sheets

US 8,849,841 B2

MEMORY CIRCUIT FOR AHO-CORASICK TYPE CHARACTER RECOGNITION AUTOMATON AND METHOD OF STORING DATA IN SUCH A CIRCUIT

FIELD OF THE INVENTION

The invention relates to the recognition of shapes and characters, and more particularly, to a memory circuit for character recognition automaton and to a method for storing data in such a memory circuit.

BACKGROUND OF THE INVENTION

A beneficial application of a memory circuit for character recognition automaton relates to forming a database for an Aho-Corasick type final state deterministic character recognition automaton for implementation of recognition of multiple information (MPR), also known by the term multi-pattern recognition. For example, but not exclusively, the recognition of characters may be used in the field of computing to recognize signatures of computer viruses or in intrusion detection systems in which known attack signatures are detected.

Referring to FIG. 1, a character recognition automaton MPR is therefore based on the use of a database B in which a list of words is stored, or in a general manner, a list of sequences of bytes to be recognized in an incoming file F is stored. The patterns are stored in the database B in the form of a node tree in which each node corresponds to a sequence of bytes of a pattern to be recognized, and in which each node corresponds to a state of the automaton.

The structure and implementation of an Aho-Corasick type automaton are well known to the person skilled in the art, and are therefore, not described in detail below. In this regard, reference may be made to the article "A. Aho and M. Corasick: Efficient String Machine, An Aid to Bibliographic Search." *In Communications of the ACM,* 18 (6): 333-340, 1975.

Construction of an Aho-Corasick automaton first requires devising the database B by providing, for each pattern to be recognized, the states and the direct transitions which lead to the recognition of the pattern. A transition function is then calculated which points to a consecutive node which corresponds to the recognition of a character in a given state. The search for a pattern in a file to be analyzed F, such as a video file or a text file, is performed thereafter by traversing the graph constructed When a final state is attained, the corresponding pattern is declared retrieved.

Devising the database is a very complex step to implement and requires relatively significant hardware, particularly in terms of memory. Thus, in an application for searching for computer virus signatures, the size of the memory required to implement an Aho-Corasick type automaton may attain, or even exceed, 100 Mb.

Furthermore, Aho-Corasick type shape and character recognition automaton are generally installed in software form so that the transfer of the data to and from the database is performed by buses, thereby requiring a considerable transfer time.

SUMMARY OF THE INVENTION

In view of the foregoing, an object of the invention is to alleviate the drawbacks related to conventional character recognition automaton.

Another object of the invention is to provide a character recognition automaton in hardware form.

These and other objects, advantages and features in accordance with the invention are provided by a memory circuit for an Aho-Corasick type character recognition automaton in which predetermined character strings are recognized in an incoming data stream by implementation of successive transitions in a node tree stored in memory. Each node in the node tree may correspond to a recognized sequence of a character string, and in which at least part of the nodes are related to a consecutive node by a valid transition from an initial state to terminal states, with each corresponding to a recognized character string.

The memory circuit may comprise first sets of consecutive memory addresses defining respective strings of consecutive nodes accessible sequentially during successive transitions to a terminal state, and second sets of memory addresses defining multiple nodes each pointing to several states.

The number of bits required to represent an Aho-Corasick automaton in memory may be greatly reduced. Furthermore, by virtue of this arrangement, the transitions may be effected using a minimum number of clock transitions.

The nodes of each string of nodes and the multiple nodes may be addressable with the help of a base node and of a relative shift with respect to the base node. The strings of nodes may be coded in memory differently from the multiple nodes.

However, each node of each string of nodes and each multiple node may be coded in the form of a frame of coding bits of characteristics relating to a transition associated with the node.

In regards to the strings of nodes, the frame may comprise in one mode of implementation a set of bits for coding a flag indicating the presence of a valid transition for the node to a consecutive node. This frame may furthermore comprise a field for coding the address of a destination node of a transition for the node in the absence of a valid transition, that is, in the case of a failed transition.

The frame furthermore may comprise a set of bits for coding the length of the coding field. It may furthermore comprise a set of bits for coding the type of destination node of the failed transition.

A set of bits for coding a following character expected for a valid transition may also be used in the coding frame of each node of the string of nodes. This frame may finally comprise a set of bits for coding a cue indicating whether the node corresponds to a terminal state forming a recognition of a character string sequence.

As far as the multiple nodes are concerned, the coding frame may comprise bits for coding parameters for calculating a valid transition function, and bits for coding a parameter for verification of the transition. This frame may furthermore comprise bits for coding a destination node of the transition for the node in case of a failed transition For example, the validation parameter is the address of an immediately preceding node, and the transition may be validated when the validation parameter of the destination node of the transition corresponds to the address of the preceding node. Specifically, each node may comprise only one antecedent so that the verification of the address of the preceding node makes it possible to verify the validity of the transition.

The coding frame may furthermore comprise bits for coding a cue indicating whether the node corresponds to a terminal state forming a recognition of a character string sequence. This frame may finally comprise coding bits indicating whether the node points to a node of a string of nodes or to a multiple node.

According to another aspect of the invention, a method for storing data in a memory circuit of an Aho-Corasick type character recognition automaton is provided. In the automaton, predetermined character strings may be recognized in an incoming data stream by implementation of successive transitions in a node tree stored in memory in which each node corresponds to a recognized sequence of a character string, and in which at least part of the nodes may be related to a consecutive node by a valid transition.

This is from an initial state to terminal states, each corresponding to a recognized character string. The method is characterized in that first sets of nodes defining respectively strings of consecutive nodes accessible sequentially during successive transitions to a terminal state are stored at first sets of successive memory addresses, and second sets of multiple nodes pointing to several states are stored at second sets of memory addresses.

The nodes of each string of nodes and the multiple nodes may be addressable with the help of a base node and of a relative shift with respect to the base node Each string of nodes and each multiple node may be coded in memory in the form of a frame of coding bits of characteristics relating to a transition associated with the node.

BRIEF DESCRIPTION OF THE DRAWINGS

Other objects, features and advantages of the invention will become apparent on reading the following description, given by non-limiting examples, and offered with reference to the appended drawings, in which.

DETAILED DESCRIPTION OF THE PREFERRED EMBODIMENTS

Figure 1:
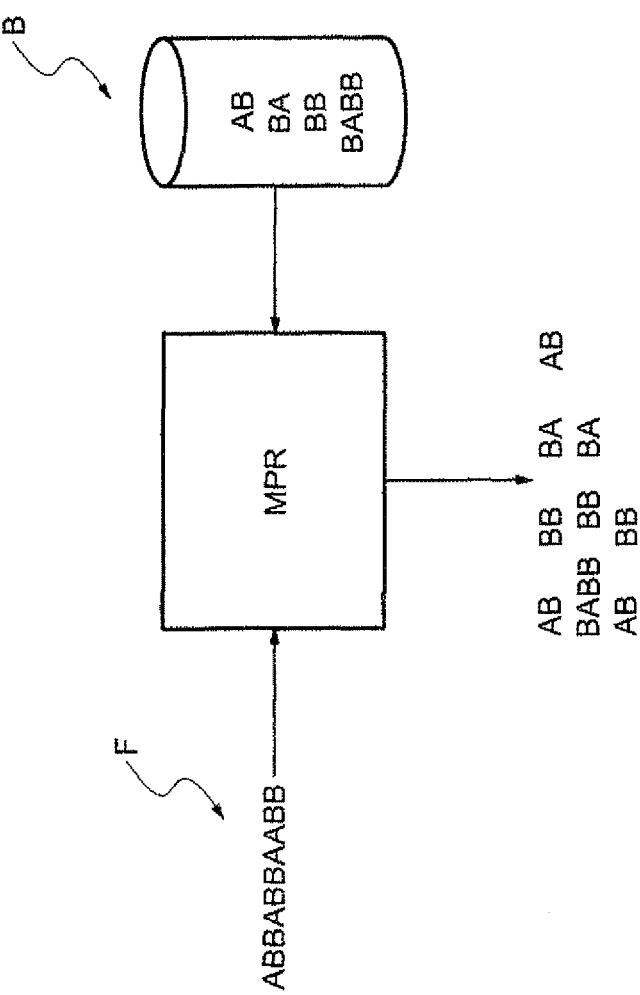
FIG. 1 illustrates the general principle of a recognition of characters by a conventional Aho-Corasick type recognition automaton in accordance with the prior art.
Figure 2:
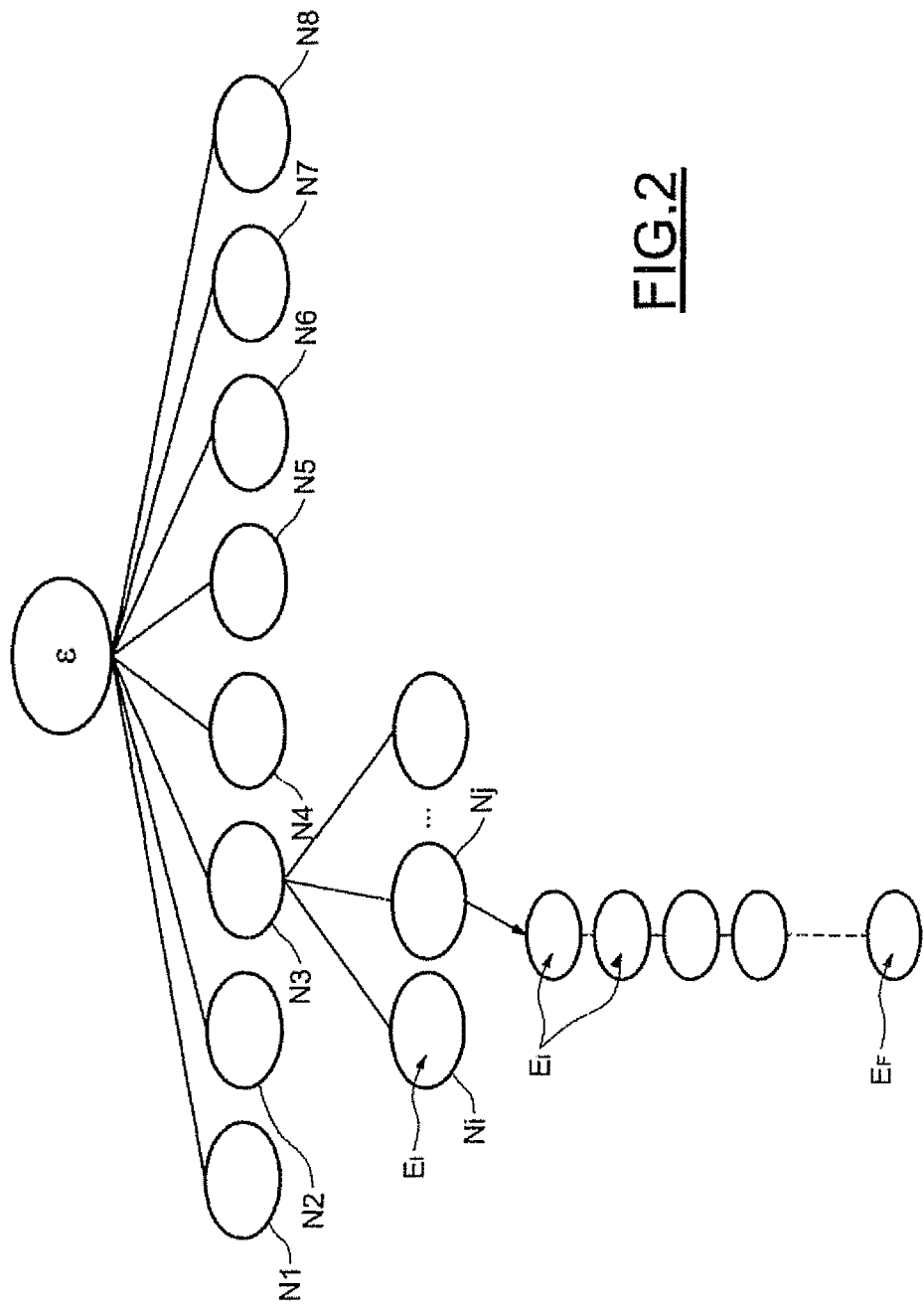
FIG. 2 is a schematic diagram illustrating the storage of data in a memory circuit in accordance with the invention.

As represented in FIG. 2, the memory circuit is organized in the form of a tree comprising a succession of nodes each corresponding to a state of an Aho-Corasick type character recognition automaton, that is, a state corresponding to a recognition of a pattern or of a sequence of characters of a pattern to be recognized in an incoming file to be analyzed. The nodes are interrelated by valid or direct transitions which lead to a final state corresponding to the recognition of a predetermined pattern.

Thus, on the basis of an initial state s, each node points to one or more consecutive nodes in such a way as to reach a final state $E_F$, passing through intermediate states such as $E_i$ so as to declare a corresponding pattern retrieved. However, each node points via a valid transition only to one or several nodes of an immediately lower order. In the absence of a valid transition, failed transitions are provided so as to bring the automaton back to a predetermined preceding state.

However, in the architecture shown in FIG. 2, one distinguishes between multiple nodes which point to several consecutive nodes and strings of nodes whose nodes each point only to a single consecutive node. Each node arises from one and only one parent. The failed transitions make it possible to reach a multiple node only.

Thus, in the example illustrated in FIG. 2, the initial node s is a multiple node which points to eight consecutive nodes N1, N2, . . . , N8. Likewise, the node designated by the reference N3 also constitutes a multiple node which points to several nodes, such as $N_i$. The other nodes, such as $N_j$, are nodes of strings and point to a single node.

Figure 3:
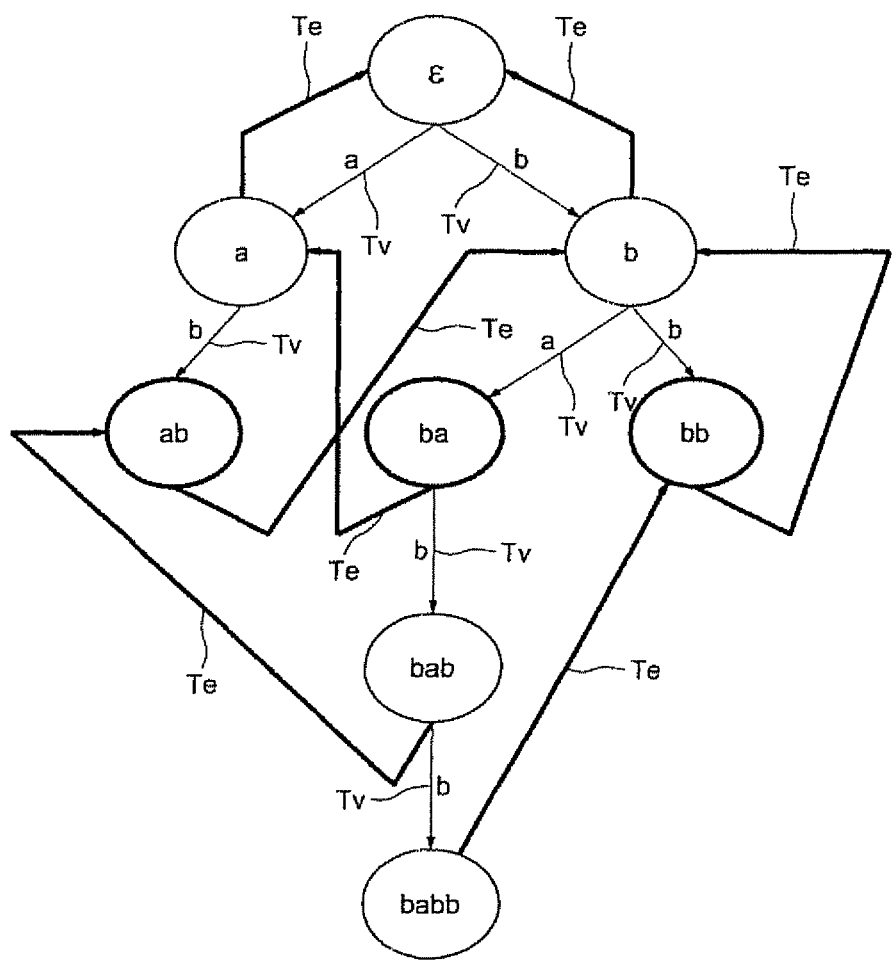
FIG. 3 shows an exemplary implementation of a base in a memory circuit in accordance with the invention.

Upon construction of the memory circuit, the transitions between nodes are devised by constructing valid transitions $T_v$ between two consecutive states which correspond to a chain of characters of the pattern to be recognized, and failed transitions $T_e$ in case of non-recognition of a character in a given state (FIG. 3).

In the example represented in FIG. 3, with the help of an initial state ε, one proceeds to a transition of states with each incoming character. Thus, the entry of character "a" or "b" makes it possible to attain the states "a or b", respectively. From the state "a", the receipt of a character "b" makes it possible to attain a final state "ab". This corresponds to the recognition of the pattern ab.

From the state b, the receipt of the symbol "a" makes it possible to attain the final state "ba", while the receipt of the character "b" makes it possible to attain the final state "bb". Finally, from the final state "ha", the receipt of the character "b" makes it possible to attain an intermediate state bab, then the final state babb after receipt of the character "b".

From each of the states mentioned above, in the absence of a valid transition, failed transitions $T_e$ make it possible to point to a predetermined earlier state using a predefined transition function, which will be described in detail below.

The nodes of each string of nodes constitute constituent nodes accessible sequentially during the traversal of the tree, and are implanted in memory at consecutive addresses with the help of a base node and of a relative shift offset with respect to this base node. Thus, the address of a node of a string of nodes is given by the following relation:

Address (offset)=C@+offset in which:

Address (offset) designates the address of a node separated from a base node by a shift offset; and C@ designates the address of the base node.

Figure 4:
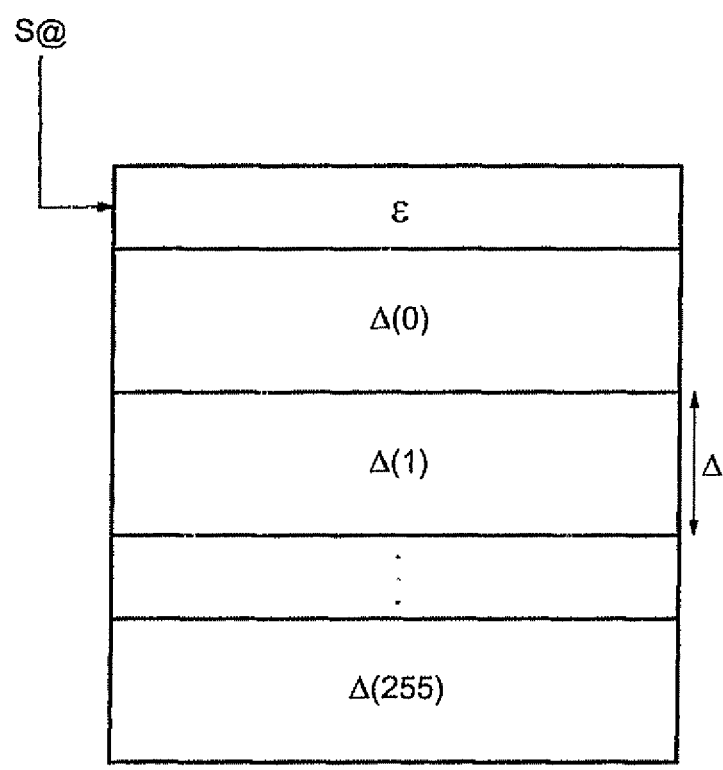
FIG. 4 illustrates the organization of the memory circuit for the storing of the multiple nodes in accordance with the invention.

For the storage in memory of the multiple nodes, the memory circuit is divided into successive spaces of memory areas, each corresponding to a symbol of an alphabet For example, the memory is subdivided into A segments of Δ descriptors, with A being equal to 256 (FIG. 4) for example. Each segment corresponds to a series of consecutive descriptors, each associated with a given symbol of the alphabet, which describe the path which allows access to the node in the tree.

The multiple nodes are thus also stored in relation to the base node ε and their address may be calculated from the relation:

Address (s, offset)=S@+s×offset+1;

Address (ε)=S@ in which:

Address(S, offset) designates the address of a multiple node spaced from an initial node ε by a shift offset;

S@ designates the address of the base node; and

Address (ε) corresponds to the address of the base node.

To reduce the memory size required for the storage of the strings of nodes and of multiple nodes, these nodes are coded in the following manner.

Figure 5:
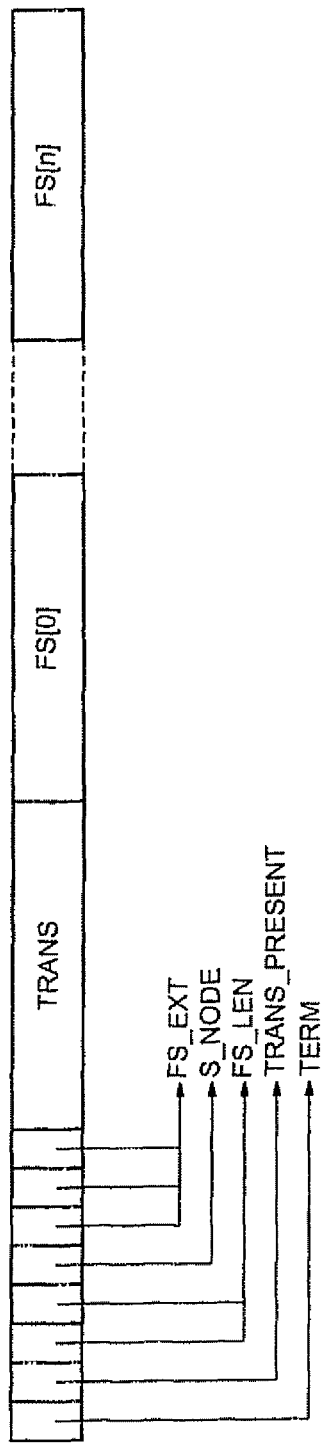
FIG. 5 is a schematic diagram illustrating the coding of the nodes of each string of nodes in accordance with the invention.

Referring first to FIG. 5, the nodes of each string of nodes are coded in memory in the form of a frame of bytes of variable length. For each node, the frame contains bytes TRANS and FS[0], . . . , FS[n] making it possible to determine the transition relating to the node, that is, to determine the destination node of the transition. The frame may also contain flags including fields making it possible to describe the content of the bytes used for devising destination of the transition, or to describe the state associated with the node or the type of transition.

Each node is thus coded at a memory address of the circuit according to the frame represented in FIG. 5, which contains the following fields:

TRANS makes it possible to determine whether there exists a valid transition, and provides a symbol of the alphabet for which there exists a valid transition. The destination state is then the consecutive state situated at the following address; and FS[0], . . . , FS[n] constitutes a word of variable length delivering the $2^{8 \times i}$ least significant bits of the destination state of a failed transition.

The flags are, for their part, formed by the following fields:

TERM: this field is formed by a bit which indicates whether the state associated with the node is a terminal state or an intermediate state;

TRANS_PRESENT: this flag is formed by a bit which indicates whether there exists a field TRANS in the frame and thus makes it possible to determine, without having to decode the field TRANS, whether there exists a valid transition for the state in progress or whether the transition associated with this state is a failed transition whose destination is coded by the bytes FS[0], . . . , FS[n];

FS_LEN: this flag contains several bits which serve to indicate the length of the field FS. For example, a value 00 indicates that the field ES corresponds to the initial state ϵ. Any other value of this field FS_LEN specifies the number of bytes used to code the field FS;

S_NODE: this flag is formed by a bit which is set to "1" when a failed transition reaches a multiple node.

According to this coding, a transition from a first state to a second state may be implemented in the following manner. From a state S and upon receipt of an input symbol $a_i$, an analyzer calculates the destination address of the transition as follows.

If the flag TRANS_PRESENT is set to "1", and if the value contained in the field TRANS corresponds to the symbol $a_i$, the destination is the state S' following in the string of nodes. The address in bytes of this state S' is then the address of the state S plus the length of the field ES and plus two bytes to take account of a byte corresponding to the field TRANS and a byte corresponding to the flags Conversely, if the field TRANS_PRESENT is not set to "1", then, if the field S_NODE is set to "1", the address of the next state S' is a multiple node at the address coded by the field FS. If the flag S_NODE is not set, then the destination state S' is a node of a string of nodes at the address coded by the field FS.

In view of the foregoing, the analyzer of the character recognition automaton can determine the transitions by way of the following algorithm:

```
State TRANS (State S, a_i)
//valid transition:
if (TRANS_PRESENT && (ai == TRANS)) return @(S) +
  FS_LEN + 2;
else
{
// failed transition:
offset = concat (FS_EXT,FS[0], ..., FS[FS_LEN];
//Go to a multiple node:
if (S_NODE) return S@ + offset × size of (multiple
  node);
else return C@ + offset
// Go to a string node.
```

Figure 6:
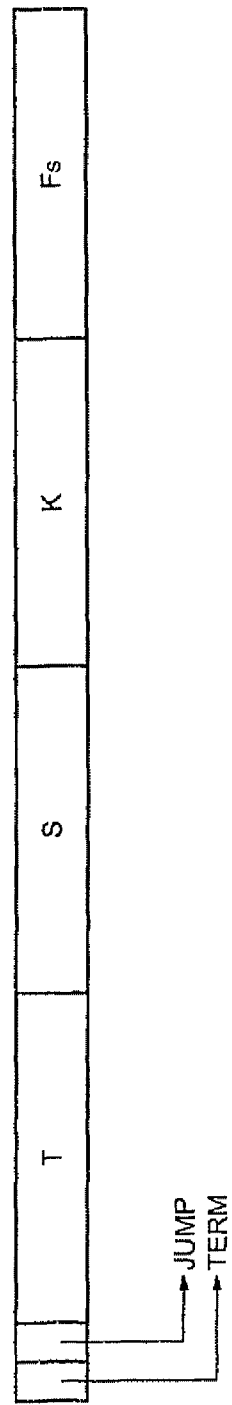
FIG. 6 is a schematic diagram illustrating the coding of multiple nodes in accordance with the invention.

Referring now to FIG. 6, the coding of the multiple nodes is performed in the following manner. These nodes are also coded in the form of a frame of bits serving to determine a transition associated with the nodes.

Each multiple node also comprises a certain number of fields serving to determine a transition associated with the node and flags making it possible to describe the multiple node or the state associated with the node.

As far as the field serving in determination of the transition is concerned, it comprises two fields T and S serving to calculate a transition function, a field K for making it possible to verify the validity of the transition thus calculated, as well as a field Fs for serving to point to a failed state in the memory.

The field T thus serves for the coding of a shift of the node in a segment.

The field S serves for the coding of the shift of the segment considered with respect to the initial node ϵ;

The field K serves for the coding of a key to verify that the valid transition calculated with the help of the fields T and S is correct and corresponds to the address of the start node of the transition; and The field FS serves for the coding of the address of the failed state in the memory.

Moreover, two fields are used:

JUMP: this field is a bit which indicates whether the multiple node points to a node of a string of nodes; and TERM: this flag is a bit which indicates whether the state in progress is a final state or otherwise.

Thus, if the flag JUMP is set to 1, the destination state of the transition is formed by a predetermined node of a string of nodes. The address is for example calculated by concatenation of the fields T, S and FS so as to calculate a shift offset with respect to the address of a base node C@.

Conversely, if the flag JUMP is not set, the destination node of the transition is formed by a multiple node and is calculated with the help of a transition function $G_s(a_i)$ with the help of the parameters T and S. At the destination address, as indicated previously, the address contained in the key K is compared with the address of the start node of the transition so as to validate the transition.

For example, the determination of a transition may be implemented by an analyzer by way of the following algorithm:

```
State TRANS (State S, a_i)
{
if (JUMP)
offset = concat (T, S, F_s);
return C@ + offset; // Go to a string node.
}
//Following theoretical multiple node for the
valid transition.
G_s(a_i) = A × (a_i ⊕ S) + T + 1;
S' = S@ + G_s(a_i) × size of (multiple node);
```

```
if (S' · K ≠ @(S)) return S@ + F_s × size of (super
node);
else return @ (S').
```

That which is claimed:

1. A memory circuit for an Aho-Corasick type character recognition automaton in which character strings are recognized in an incoming data stream by implementation of successive transitions in a node tree in which each node corresponds to a recognized sequence of a character string and in which at least part of the nodes are related to a consecutive node by a valid transition, from an initial state to terminal states each corresponding to a recognized character string, the memory circuit comprising:
- a plurality of first sets of consecutive memory addresses defining respective strings of consecutive nodes accessible sequentially during successive transitions to a terminal state for the Aho-Corasick type character recognition automaton;
- a plurality of second sets of memory addresses defining multiple nodes each pointing to a plurality of states for the Aho-Corasick type character recognition automaton, and with at least one of the multiple nodes pointing to at least three states; and
- with the nodes of each string of consecutive nodes and the multiple nodes being addressable based upon the address of a base node and a relative shift with respect to the address of the base node, each node in the string of consecutive nodes being coded as a frame of bytes of variable length, with each frame comprising fields that determine transition relating to the node, and a plurality of flags describing content of the bytes used for destination of the transition, to describe a state associated with the node, and a type of transition;
- with each node of each multiple node being coded as a frame of coding bits having characteristics relating to a transition associated therewith, with each coding frame comprising bits for coding parameters for calculating a valid transition function, and bits for coding a parameter for verification of the transition.

2. A memory circuit according to claim 1, wherein each node of each string of consecutive nodes is coded as a frame of coding bits having characteristics relating to a transition associated therewith.

3. A memory circuit according to claim 2, wherein a coding frame of each node of the string of consecutive nodes comprises a set of bits for coding a flag indicating a valid transition to a consecutive node.

4. A memory circuit according to claim 3, wherein the coding frame of each node of the string of consecutive nodes comprises a coding field for coding the address of a destination node of a transition in absence of a valid transition.

5. A memory circuit according to claim 4, wherein the coding frame of each node of the string of consecutive nodes further comprises a set of bits for coding a length of the coding field.

6. A memory circuit according to claim 4, wherein the coding frame of each node of the string of consecutive nodes further comprises a set of bits for coding a type of destination node of a non-valid transition.

7. A memory circuit according to claim 2, wherein a coding frame of each node of the string of consecutive nodes comprises a set of bits for coding a following character expected for a valid transition.

8. A memory circuit according to claim 2, wherein a coding frame of each node of the string of consecutive nodes comprises a set of bits for coding a cue indicating whether the node corresponds to a terminal state constituting recognition of a character string sequence.

9. A memory circuit according to claim 1, wherein the coding frame of each multiple node further comprises bits for coding a destination node of the transition for the node in absence of a valid transition.

10. A memory circuit according to claim 1, wherein the bits for coding the parameter for verification of the transition validation parameter is an address of an immediately preceding node, the transition being validated when the validation parameter of the destination node of the transition corresponds to an address of the preceding node.

11. A memory circuit according to claim 1, wherein the coding frame of each multiple node further comprises bits for coding a cue indicating whether the node corresponds to a terminal state constituting a recognition of a character string sequence.

12. An Aho-Corasick type character recognition automaton device comprising:
- a memory circuit for receiving as input an incoming data stream, and for recognizing character strings in the incoming data stream by implementation of successive transitions in a node tree stored therein in which each node corresponds to a recognized sequence of a character string and in which at least part of the nodes are related to a consecutive node by a valid transition, from an initial state to terminal states each corresponding to a recognized character string, the memory circuit comprising
- a plurality of first sets of consecutive memory addresses defining respective strings of consecutive nodes accessible defining respective strings of consecutive nodes accessible sequentially during successive transitions to a terminal state,
- a plurality of second sets of memory addresses defining multiple nodes each pointing to a plurality of states for the Aho-Corasick type character recognition automaton, and with at least one of the multiple nodes pointing to at least three states, and
- with the nodes of each string of consecutive nodes and the multiple nodes being addressable based upon the address of a base node and a relative shift with respect to the address of the base node, each node in the string of consecutive nodes being coded as a frame of bytes of variable length, with each frame comprising fields that determine transition relating to the node, and a plurality of flags describing content of the bytes used for destination of the transition, to describe a state associated with the node, and a type of transition;
- with each node of each multiple node being coded as a frame of coding bits having characteristics relating to a transition associated therewith, with each coding frame comprising bits for coding parameters for calculating a valid transition function, and bits for coding a parameter for verification of the transition.

13. A recognition automaton device according to claim 12, wherein each node of each string of consecutive nodes is coded as a frame of coding bits having characteristics relating to a transition associated therewith.

14. A recognition automaton device according to claim 13, wherein the coding frame of each node of the string of consecutive nodes comprises a set of bits for coding a flag indicating a valid transition to a consecutive node.

15. A recognition automaton device according to claim 13, wherein the coding frame of each node of the string of consecutive nodes comprises a set of bits for coding a following character expected for a valid transition.

16. A recognition automaton device according to claim 13, wherein the coding frame of each node of the string of consecutive nodes comprises a set of bits for coding a cue indicating whether the node corresponds to a terminal state constituting recognition of a character string sequence.

17. A method for storing data in a memory circuit of an Aho-Corasick type character recognition automaton in which character strings are recognized in an incoming data stream by implementation of successive transitions in a node tree stored in the memory circuit in which each node corresponds to a recognized sequence of a character string and in which at least part of the nodes are related to a consecutive node by a valid transition, from an initial state to terminal states each corresponding to a recognized character string, the method comprising:
  defining respective strings of consecutive nodes in a plurality of first sets of consecutive memory addresses for the Aho-Corasick type character recognition automaton, each consecutive node being accessible sequentially during successive transitions to a terminal state;
  defining multiple nodes in a plurality of second sets of memory addresses for the Aho-Corasick type character recognition automaton, each multiple node pointing to a plurality of states, and with at least one of the multiple nodes pointing to at least three states; and
  with the nodes of each string of consecutive nodes and the multiple nodes being addressable based upon the address of a base node and a relative shift with respect to the address of the base node, each node in the string of consecutive nodes being coded as a frame of bytes of variable length, with each frame comprising fields that determine transition relating to the node, and a plurality of flags describing content of the bytes used for destination of the transition, to describe a state associated with the node, and a type of transition;
  with each node of each multiple node being coded as a frame of coding bits having characteristics relating to a transition associated therewith, with each coding frame comprising bits for coding parameters for calculating a valid transition function, and bits for coding a parameter for verification of the transition.

18. A method according to claim 17, wherein each node of each string of consecutive nodes is coded as a frame of coding bits having characteristics relating to a transition associated therewith.

19. A method for storing data in a memory circuit of an Aho-Corasick type character recognition automaton, the method comprising:
  recognizing character strings in an incoming data stream by implementation of successive transitions in a node tree stored in the memory circuit in which each node corresponds to a recognized sequence of a character string and in which at least part of the nodes are related to a consecutive node by a valid transition, from an initial state to terminal states each corresponding to a recognized character string;
  defining respective strings of consecutive nodes in a plurality of first sets of consecutive memory addresses for an Aho-Corasick type character recognition automaton, each consecutive node being accessible sequentially during successive transitions to a terminal state;
  defining multiple nodes in a plurality of second sets of memory addresses for the Aho-Corasick type character recognition automaton, each multiple node pointing to a plurality of states, and with at least one of the multiple nodes pointing to at least three states; and
  with the nodes of each string of consecutive nodes and the multiple nodes being addressable based upon the address of a base node and a relative shift with respect to the address of the base node, each node in the string of consecutive nodes being coded as a frame of bytes of variable length, with each frame comprising fields that determine transition relating to the node, and a plurality of flags describing content of the bytes used for destination of the transition, to describe a state associated with the node, and a type of transition;
  with each node of each multiple node being coded as a frame of coding bits having characteristics relating to a transition associated therewith, with each coding frame comprising bits for coding parameters for calculating a valid transition function, and bits for coding a parameter for verification of the transition.

20. A method according to claim 19, wherein each node of each string of consecutive nodes is coded as a frame of coding bits having characteristics relating to a transition associated therewith.

21. A method according to claim 20, wherein the coding frame of each node of the string of consecutive nodes comprises a set of bits for coding a flag indicating a valid transition to a consecutive node.

22. A method according to claim 21, wherein the coding frame of each node of the string of consecutive nodes comprises a coding field for coding the address of a destination node of a transition in absence of a valid transition.

23. A method according to claim 20, wherein the coding frame of each node of the string of consecutive nodes comprises a set of bits for coding a following character expected for a valid transition.

24. A method according to claim 20, wherein the coding frame of each node of the string of consecutive nodes comprises a set of bits for coding a cue indicating whether the node corresponds to a terminal state constituting recognition of a character string sequence.

* * * * *

UNITED STATES PATENT AND TRADEMARK OFFICE
CERTIFICATE OF CORRECTION

PATENT NO. : 8,849,841 B2
APPLICATION NO. : 11/533543
DATED : September 30, 2014
INVENTOR(S) : Furodet et al.

It is certified that error appears in the above-identified patent and that said Letters Patent is hereby corrected as shown below:

In The Claims

Column 8, Lines 35-37    Delete: "addresses defining respective strings of consecutive nodes accessible defining respective strings of consecutive nodes accessible sequentially"
Insert: --addresses defining respective strings of consecutive nodes accessible sequentially--

Signed and Sealed this
Twenty-first Day of July, 2015

Michelle K. Lee
*Director of the United States Patent and Trademark Office*